(12) United States Patent
Kim (10) Patent No.: US 10,489,290 B2
(45) Date of Patent: Nov. 26, 2019

(54) DATA STORAGE APPARATUS AND OPERATING METHOD THEREOF

(71) Applicant: SK hynix Inc., Gyeonggi-do (KR)

(72) Inventor: Soo Nyun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 15/670,140

(22) Filed: Aug. 7, 2017

(65) Prior Publication Data

US 2018/0189172 A1 Jul. 5, 2018

(30) Foreign Application Priority Data

Jan. 4, 2017 (KR) .................. 10-2017-0001447

(51) Int. Cl.
*G06F 12/02* (2006.01)
*G06F 12/1009* (2016.01)
*G06F 3/06* (2006.01)
*G06F 11/10* (2006.01)

(52) U.S. Cl.
CPC .......... *G06F 12/0246* (2013.01); *G06F 3/061* (2013.01); *G06F 3/0631* (2013.01); *G06F 3/0659* (2013.01); *G06F 3/0679* (2013.01); *G06F 3/0688* (2013.01); *G06F 11/108* (2013.01); *G06F 12/1009* (2013.01); *G06F 3/0656* (2013.01); *G06F 2212/2022* (2013.01); *G06F 2212/7201* (2013.01); *G06F 2212/7203* (2013.01)

(58) Field of Classification Search
CPC ......... G06F 12/0246; G06F 2212/7201; G06F 12/1009; G06F 2212/2022; G06F 3/061; G06F 3/0656; G06F 3/0659; G06F 3/0688; G06F 11/108
USPC .......................................................... 711/103
See application file for complete search history.

(56) References Cited

U.S. PATENT DOCUMENTS

| | | | | |
|---|---|---|---|---|
| 2011/0238629 A1* | 9/2011 | Post | ................... | G06F 12/0246 707/674 |
| 2013/0275656 A1* | 10/2013 | Talagala | .............. | G06F 12/0246 711/103 |
| 2015/0186224 A1* | 7/2015 | Lin | ..................... | G06F 12/0802 714/6.12 |
| 2017/0060439 A1* | 3/2017 | Harasawa | ............. | G06F 3/0611 |
| 2017/0286287 A1* | 10/2017 | Hady | ................... | G06F 12/0246 |
| 2017/0300381 A1* | 10/2017 | Mizushima | ............. | G06F 12/16 |

FOREIGN PATENT DOCUMENTS

KR 100817087 3/2008

* cited by examiner

*Primary Examiner* — Hashem Farrokh
(74) *Attorney, Agent, or Firm* — IP & T Group LLP (57) ABSTRACT

A data storage apparatus includes a nonvolatile memory device, a random-access memory including an address mapping table configured to store mapping information between a logical address received from a host apparatus and a physical address for the nonvolatile memory device, and a processor configured to generate a modified write logical address by changing a value of a specific bit among bits of a write logical address when a write request is received from the host apparatus, and store the modified write logical address in the address mapping table.

16 Claims, 10 Drawing Sheets

DATA STORAGE APPARATUS AND OPERATING METHOD THEREOF

CROSS-REFERENCES TO RELATED APPLICATION

The present application claims priority under 35 U.S.C. § 119(a) to Korean application number 10-2017-0001447, filed on Jan. 4, 2017, in the Korean Intellectual Property Office, which is incorporated herein by reference in its entirety.

BACKGROUND

1. Technical Field

Various embodiments may generally relate to a semiconductor apparatus, and more particularly, to a data storage apparatus and an operating method thereof.

2. Related Art

In recent years, the paradigm for computer environments changed to ubiquitous computing which may use computer systems every time everywhere. As a result, use of portable electronic apparatuses such as a mobile phone, a digital camera, and a laptop computer has been increasing rapidly. Generally, portable electronic apparatuses use data storage apparatuses that employ memory devices. Data storage apparatuses may be used to store data used in the portable electronic apparatuses.

Data storage apparatuses using memory devices have no mechanical driving units and exhibit good stability and endurance, fast information access rate, and low power consumption. Such data storage apparatuses may include a universal serial bus (USB) memory device, a memory card having various interfaces, a universal flash storage (UFS) device, a solid-state drive (SSD), and the like.

SUMMARY

Embodiments are provided to a data storage apparatus capable of improving read performance and an operating method thereof.

In an embodiment of the present disclosure, a data storage apparatus may include: a nonvolatile memory device; a random-access memory including an address mapping table configured to store mapping information between a logical address received from a host apparatus and a physical address for the nonvolatile memory device; and a processor configured to generate a modified write logical address by changing a value of a specific bit among bits of a write logical address when a write request is received from the host apparatus and store the modified write logical address in the address mapping table.

In another embodiment of the present disclosure, an operating method of a data storage apparatus may include: determining whether or not a write request is received from a host apparatus; and generating a modified write logical address by changing a value of a specific bit of a write logical address when the write request is received from the host apparatus, and storing the modified write logical address in an address mapping table.

In an embodiment of the present disclosure, a data storage apparatus may include: a nonvolatile memory device; an address mapping table configured to store mapping information between a logical address received from a host apparatus and a physical address of the nonvolatile memory device, and store a modified write logical address when a write request is received from the host apparatus; a write buffer configured to temporarily store a write logical address and write data when the write request is received from the host apparatus; and a processor configured to generate the modified write logical address by changing a value of a specific bit of the write logical address.

According to the embodiments, an operation of searching a read-requested logical address for determining a storage position of read-requested data may be shortened in a process of processing the read request from a host apparatus and thus the read operation speed and read performance of the data storage apparatus may be improved.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The present disclosure, however, may be embodied in various different forms, and should not be construed as being limited to the illustrated embodiments herein. Rather, these embodiments are provided as examples so that this disclosure will be thorough and complete, and will fully convey the various aspects and features of the present invention to those skilled in the art to which the present invention pertains.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, b, and C.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

Figure 1:
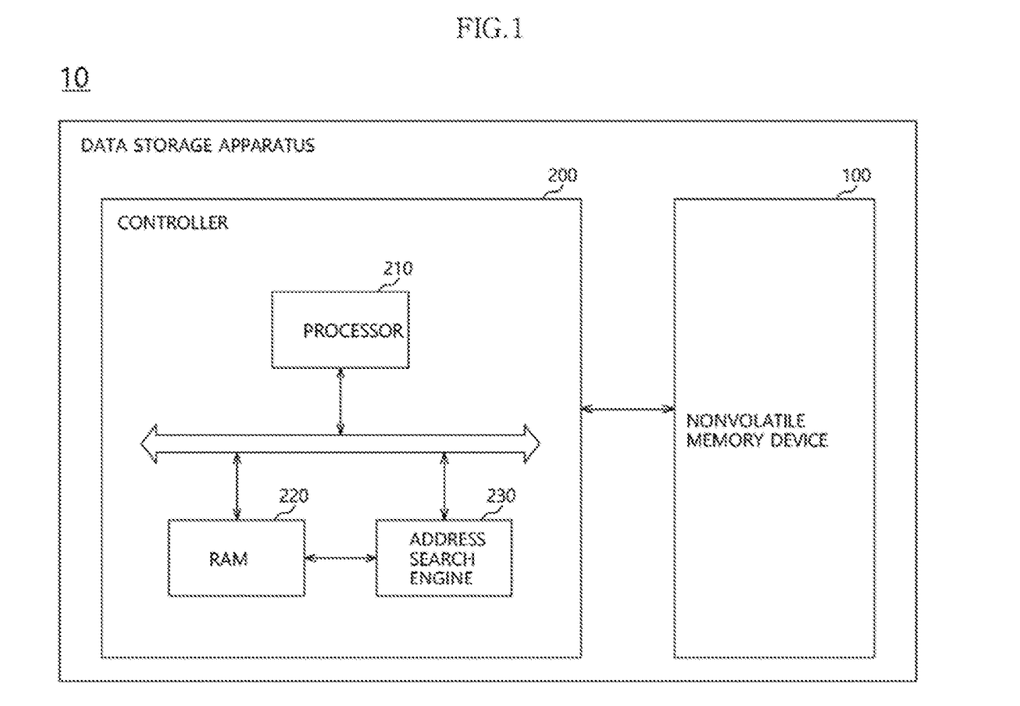
FIG. 1 is a block diagram illustrating a data storage apparatus according to an embodiment of the present disclosure.
Figure 2A:
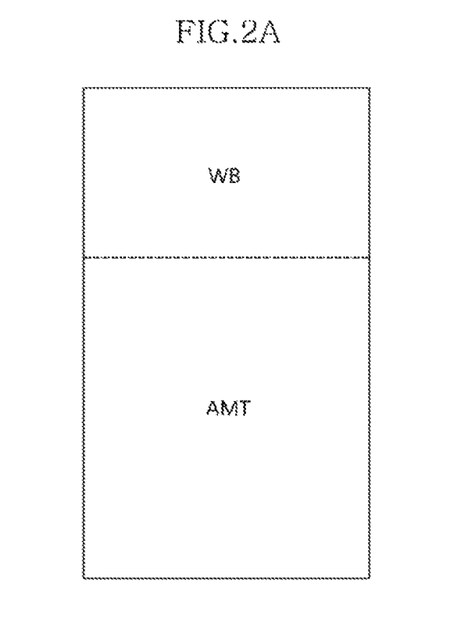
FIGS. 2A and 2B are diagrams conceptually illustrating a configuration of a random-access memory shown in FIG. 1.
Figure 2B:
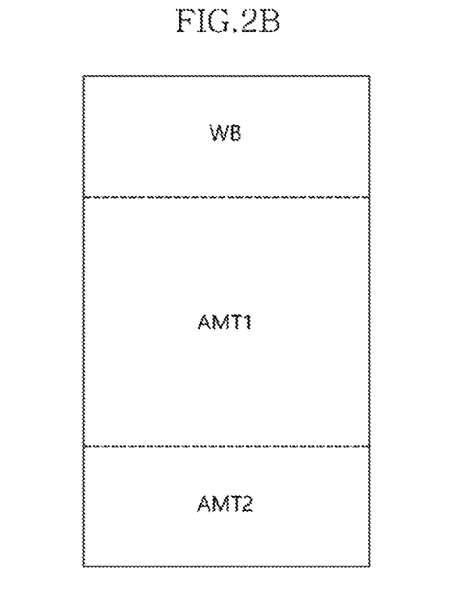

FIG. 1 is a block diagram illustrating a data storage apparatus 10 according to an embodiment of the present disclosure. FIGS. 2A and 2B are diagrams conceptually illustrating a configuration of a random-access memory (RAM) 220 of FIG. 1.

Referring to FIG. 1, the data storage apparatus 10 may store data to be accessed by a host apparatus (not shown) such as a mobile phone, an MP3 player, a laptop computer, a desktop computer, a game player, a television (TV), or an in-vehicle infotainment system, and the like. The data storage apparatus 10 may also be referred to as a memory system.

The data storage apparatus 10 may be manufactured as any one among various types of storage apparatuses according to a protocol of an interface coupled to the host apparatus. For example, the data storage apparatus 10 may be configured of any one of various types of storage apparatuses, such as a solid-state drive (SSD), a multimedia card in the form of an MMC, an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, and a memory stick, and the like.

The data storage apparatus 10 may be manufactured as any one among various types of packages. For example, the data storage apparatus 10 may be manufactured as any one of various types of packages, such as a package on package (POP), a system in package (SIP), a system on chip (SOC), a multi-chip package (MCP), a chip on board (COB), a wafer-level fabricated package (WFP), and a wafer-level stack package (WSP).

The data storage apparatus 10 may include a nonvolatile memory device 100 and a controller 200.

The nonvolatile memory device 100 may be operated as a storage medium of the data storage apparatus 10. The nonvolatile memory device 100 may include any one of various types of nonvolatile memory devices, such as a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase-change random-access memory (PRAM) using a chalcogenide alloy, and a resistive random-access memory (RERAM) using a transition metal compound.

It has been illustrated in FIG. 1 that the data storage apparatus 10 includes one nonvolatile memory device 100, but this is merely exemplary for clarity. The data storage apparatus 10 may include a plurality of nonvolatile memory devices and the embodiments described herein may be equally applied to the data storage apparatus 10 including the plurality of nonvolatile memory devices.

Although not shown in FIG. 1, the nonvolatile memory device 100 may include a memory cell array having a plurality of memory cells arranged in regions in which a plurality of bit lines (not shown) and a plurality of word lines (not shown) cross to each other.

The nonvolatile memory device 100 may include a plurality of memory blocks (not shown) and each of the plurality of memory blocks may include a plurality of pages.

The controller 200 may include a processor 210, a random-access memory (RAM) 220, and an address search engine 230. Although not shown in FIG. 1, the controller 200 may further include a host interface unit which transmits and receives a control signal, an address, data, and the like to and from the host apparatus, and a memory interface unit which transmits and receives a control signal, an address signal, data and the like to and from the nonvolatile memory device 100.

The processor 210 may control an overall operation of the controller 200. The processor 210 may analyze and process a signal, a command, or a request input from the host apparatus.

For example, when a read request and a logical block address (LBA) (hereinafter, referred to as a "read logical address") are received from the host apparatus, the processor 210 may read data from the nonvolatile memory device 100 based on the received read logical address and transmit the read data (hereinafter, referred to as "read data") to the host apparatus.

When a write request, a logical block address (LBA) (hereinafter, referred to as a "write logical address"), and data to be written (hereinafter, referred to as "write data") are received from the host apparatus, the processor 210 may write the write data in the nonvolatile memory device 100 based on the received write logical address.

For example, the processor 210 may decode and drive firmware data loaded onto the RAM 220. The processor 210 may be implemented with hardware or a combination of hardware and software.

The read logical address and the write logical address may be one logical address which is transmitted from the host apparatus together with the read request or the write request, respectively. But the logical address may refer to the read logical address and the write logical address to clearly determine whether the logical address is a logical address transmitted in the read request or a logical address transmitted in the write request.

The RAM 220 may store firmware data driven through the processor 210. The RAM 220 may also store system data required for driving the firmware data. For example, the RAM 220 may be operated as a working memory of the processor 210.

The RAM 220 may temporarily store the write data to be transmitted to the nonvolatile memory device 100 from the host apparatus or the read data to be transmitted to the host apparatus from the nonvolatile memory device 100, and may temporarily store the write logical address transmitted from the host apparatus.

For example, referring to FIG. 2A, the RAM 220 may include a write buffer WB which temporarily stores the write data and the write logical address transmitted from the host apparatus. Although not shown in FIG. 2A, the write buffer WB may include a write data buffer which temporarily stores the write data and an address buffer which temporarily stores the write logical address.

The RAM 220 may include an address mapping table AMT which stores a physical block address (PBA) (hereinafter, referred to as a "physical address") in which the write data is stored in the nonvolatile memory device 100, and the write logical address corresponding thereto which match with each other.

The write buffer WB may temporarily store the write logical address and the write data transmitted from the host apparatus until the write data is stored in the nonvolatile memory device 100. After the write data is stored in the nonvolatile memory device 100, the write logical address and the write data stored in the write buffer WB may be deleted from the write buffer WB, but this is not limited thereto.

The address mapping table AMT may be configured to correspond to one or more memory blocks among the plurality of memory blocks included in the nonvolatile memory device 100 or to correspond to all the plurality of memory blocks.

In operation, when a write request is received from the host apparatus, the address mapping table AMT may temporality store a modified write logical address generated through the processor 210. The modified write logical address in an embodiment may refer to a write logical address generated by changing a value of a specific bit among bits of the write logical address. The value of the specific bit of the modified write logical address may provide information relating to a current position of the write data corresponding to the write logical address.

For example, the value of the specific bit of the modified write logical address may be used as information indicating whether the write data corresponding to the write logical address is currently temporarily stored in the write buffer WB or is currently stored in a memory block of the nonvolatile memory device 100.

The modified write logical address stored in the address mapping table AMT may be recovered to the original write logical address through the processor 210 after the write data corresponding to the write logical address is stored in the memory block of the nonvolatile memory device 100.

For example, in the embodiment, when the write logical address and the write data are received from the host apparatus, the write logical address may be temporarily stored in the write buffer WB and simultaneously the modified write logical address may be stored in the address mapping table AMT. This allows to quickly search the read logical address by scanning only the address mapping table AMT when the read request is received from the host apparatus. For example, this search may be performed by the processor 210, or by the address search engine under the control of the processor 210.

In general, when a read request is received from the host apparatus, the processor 210 may determine whether or not the read logical address is presented in the write buffer WB by scanning the write buffer WB of the RAM 220. The processor 210 may determine that the read logical address is presented in the write buffer WB when the read logical address received along with the read request is matched with the write logical address stored in the write buffer WB. The processor 210 may read the read data from the write buffer WB and transmit the read data to the host apparatus when the read logical address is presented in the write buffer WB, or the processor 210 may search the read logical address by scanning the address mapping table AMT, read the read data from the nonvolatile memory device 100 and transmit the read data to the host apparatus when the read logical address is not presented in the write buffer WB.

Accordingly, the operation of searching the read logical address according to the read request of the host apparatus may be performed in two stages. Therefore, the read speed may be degraded and the read performance may be degraded.

In the embodiment, as described above, since the read logical address is searched only in the address mapping table AMT, the current position of the read data may be determined more quickly and thus the read performance of the data storage apparatus 10 may be improved.

The address mapping table AMT in the embodiment may include a logical block address to physical block address (L2P) table and a physical block address to logical block address (P2L) table.

Figure 3A:
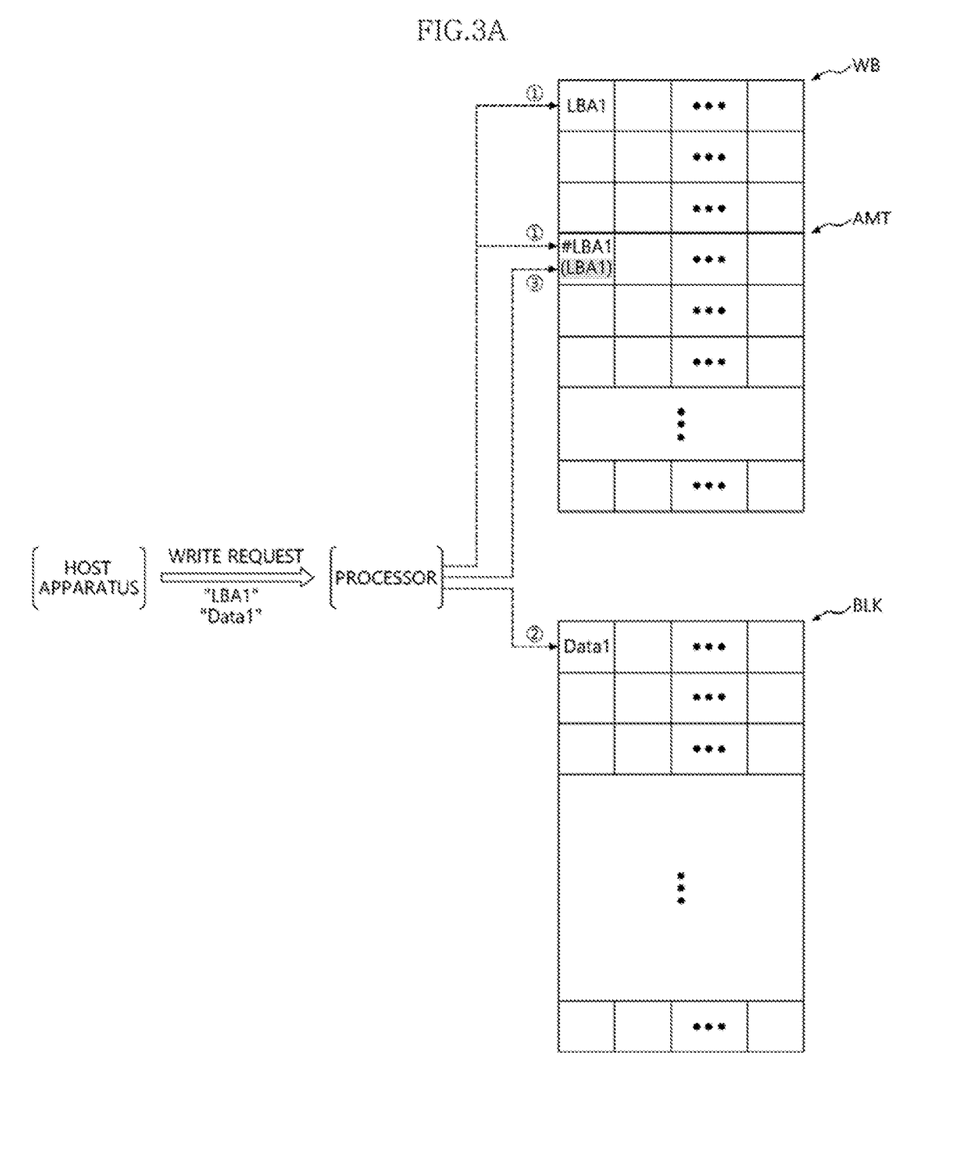
FIG. 3A is a diagram illustrating an example of a data write operation according to an embodiment of the present disclosure.
Figure 3B:
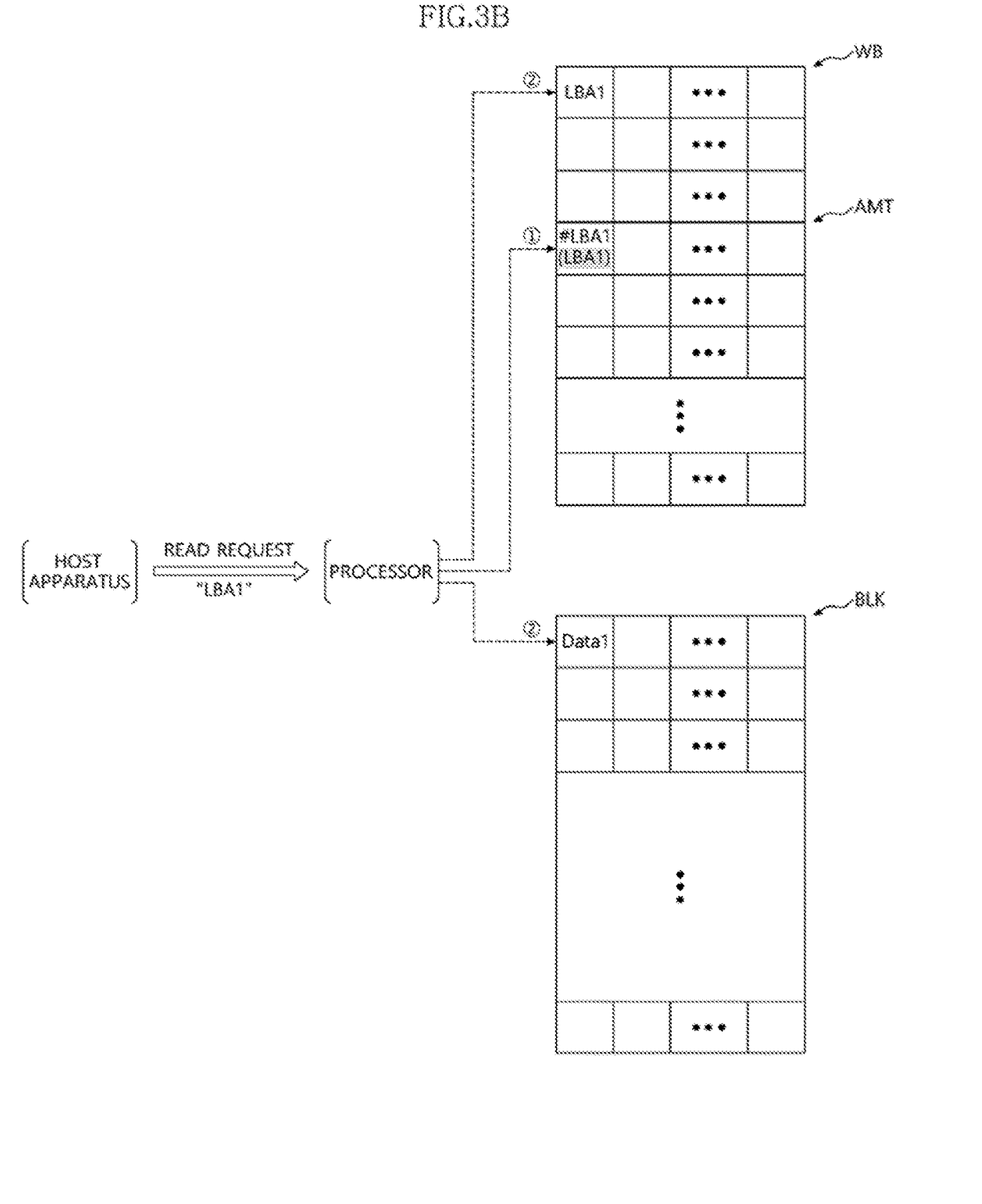
FIG. 3B is a diagram illustrating an example of a data read operation according to an embodiment of the present disclosure.

As Illustrated in FIGS. 3A and 3B, the address mapping table AMT may be divided into a plurality of segments. A corresponding memory block of the nonvolatile memory device 100 may also include a plurality of segments. For example, the segments of the address mapping table AMT may correspond to the segments of the memory block.

In an embodiment, the number of segments of the address mapping table AMT may be the same as the number of segments of the memory block, but this is not limited thereto. The number of segments of the address mapping table AMT may be larger than the number of segments of the memory block. For example, the number of segments of the address mapping table AMT may be larger than the number of segments of the memory block by the number of segments included in at least one or more pages of the memory block, but this is not limited thereto. The size of the segment in the address mapping table AMT may be different from that of the segment in the memory block, but this not limited thereto.

Referring to FIG. 2B, the RAM 220 may include the write buffer WB, a first address mapping table AMT1, and a second address mapping table AMT2. As described above, the write buffer WB may include the write data buffer configured to temporarily store the write data to be transmitted to the nonvolatile memory device 100 and the address buffer configured to temporarily store the write logical address.

The first address mapping table AMT1 may store logical addresses for a memory block of the nonvolatile memory device 100 performing a write operation, hereinafter, also referred to as an open block. The first address mapping table AMT1 may have the same configuration as the address mapping table AMT illustrated in FIG. 2A. However, the logical addresses stored in the first address mapping table AMT1 may be deleted when the write operation of the corresponding open block is completed and updating of mapping information on the open block is completed.

The second address mapping table AMT2 may store only a portion of pieces of address mapping information on a memory block of which a write operation is completed, hereinafter, also referred to as a closed block. For example, the second address mapping table AMT2 may be a map cache.

The updated address mapping information on the closed block in which the write operation is completed may be stored in a map table (not shown) in the nonvolatile memory device 100. The map table in the nonvolatile memory device 100 may store pieces of address mapping information on the whole nonvolatile memory device 100, for example, all the closed memory blocks of the nonvolatile memory device, and, thus, the map table may have a significant large size.

When a read request is received from the host, if the read-requested data is not presented in the write buffer WB, the processor 210 may inevitably search the position of the read-requested data by scanning the map table of the nonvolatile memory device 100. However, considerable time may be required to search the whole map table of the nonvolatile memory device 100 which has a significantly large size as described above, and, thus, the read performance may be degraded.

For this reason, in an embodiment of the present invention, a portion of pieces of address mapping information of the map table stored in the nonvolatile memory device 100, for example, pieces of mapping information on logical addresses having high access frequency or the latest access-requested logical addresses may be loaded onto the second address mapping table AMT2 of the RAM 220. Accordingly, the position of the read-requested data may be searched faster by searching the second address mapping table AMT2.

In FIG. 2B, the first address mapping table AMT1 may store pieces of address mapping information on the open blocks among the plurality of memory blocks of the nonvolatile memory device 100, whereas the second address mapping table AMT2 may store a portion of pieces of address mapping information on the closed blocks among the plurality of memory blocks in the nonvolatile memory device 100.

The address search engine 230 may be configured to search a read logical address by scanning the address mapping table AMT of the RAM 220 under the control of the processor 210 when a read request is received from the host apparatus. For example, the address search engine 230 may search the read logical address transmitted from the host apparatus by scanning the address mapping table AMT of the RAM 220 to a reverse direction of a write direction and transmit the searched read logical address to the processor 210.

The processor 210 may store the write logical address and the write data in the write buffer WB in the write request from the host apparatus and simultaneously store the modified write logical address in which a value of a specific bit of the write logical address is changed in the address mapping table AMT. The processor 210 may control the operation of the nonvolatile memory device 100 so that the write data is written in the nonvolatile memory device 100. When the write data is written in the nonvolatile memory device 100, the processor 210 may recover the modified write logical address to the original write logical address by changing or removing the value of the specific bit of the modified write logical address stored in the address mapping table AMT.

For example, when the read request is received from the host apparatus, the processor 210 may search the read logical address not by scanning the write buffer WB but by scanning only the address mapping table AMT. In this example, the processor 210 may perform a scanning operation on the address mapping table AMT or the address search engine 230 may scan the address mapping table AMT under the control of the processor 210 and provide the scanning result to the processor 210.

The processor 210 may verify a value of a specific bit of the searched read logical address and determine a storage position of read data corresponding to the read logical address based on the value of the specific bit. For example, the processor 210 may determine whether the read data is stored in the write buffer WB or in the memory block of the nonvolatile memory device 100 based on the value of the specific bit, read the read data from the corresponding position, and transmit the read data to the host apparatus.

For example, when the read request is received from the host apparatus in a state that the RAM 220 includes two address mapping tables, for example, the first address mapping table AMT1 and the second address mapping table AMT2 as illustrated in FIG. 2B, the first address mapping table AMT1 may be scanned through the processor 210 and the second address mapping table AMT2 may be scanned through the address search engine 230. In this example, the first address mapping table AMT1 and the second address mapping table AMT2 may be simultaneously scanned. In another example, the first address mapping table AMT1 may be scanned through the address search engine 230 and the second address mapping table AMT2 may be scanned through the processor 210.

A write operation of the data storage apparatus 10 according to the embodiment will be described in detail with reference to FIG. 3A. It has been described in FIG. 3A that the RAM 220 includes the write buffer WB and the address mapping table AMT, but this is not limited thereto.

FIG. 3A is a diagram illustrating an example of a data write operation according to an embodiment of the present disclosure.

Referring to FIG. 3A, when a write request, a write logical address LBA1 and write data Data1 are received from a host apparatus, the processor 210 may store the write logical address LBA1 and the write data Data1 in the write buffer WB (①) and simultaneously store the modified write logical address #LBA1 in the address mapping table AMT (①). The modified write logical address #LBA1 may be generated by changing a value of a specific bit among all bits of the original write logical address LBA1 transmitted from the host apparatus.

For clarity, it may be assumed that the write logical address is represented with 4 bytes (i.e., 32 bits), "LBA1" means that the logical address is "1", and the write logical address LBA1 may be stored in the write buffer WB and the address mapping table AMT in hexadecimal number.

The processor 210 may store the write logical address LBA1 with "0x00000001" in the write buffer WB, and simultaneously store the modified write logical address #LBA1 with "0x80000001" In the address mapping table AMT. That is, the processor 210 may generate the modified write logical address #LBA1 by changing a value of the most significant bit (MSB) of the write logical address LBA1 to "1". Here, the term "change" may refer to term "invert" or "Insert". In this example, the specific bit changed in the modified write logical address #LBA1 may be the MSB.

The method of generating the modified write logical address #LBA1 in the processor 210 is not limited thereto and a bit value of an arbitrary position in the write logical address LBA1 may be changed. Merely, bit values in positions which may not have effect on the actual write logical address LBA1 may be changed.

Information on a bit indicating a current storage position of the write data among 32 bits of the write logical address may be set in advance. The processor 210 may have known the information in advance and in this state, the processor 210 may generate the modified write logical address #LBA1 by changing a value of the corresponding bit and store the modified write logical address in the address mapping table AMT.

The processor 210 may control the nonvolatile memory device 100 to write the write data Data1 in an arbitrary memory block BLK of the nonvolatile memory device 100 (②). The method of controlling the nonvolatile memory device 100 to perform the write operation in the processor 210 is widely known and thus detailed description thereof will be omitted.

The processor 210 may recover the modified write logical address #LBA1 stored in the address mapping table AMT to the original write logical address LBA1, for example, the write logical address LBA1 transmitted from the host apparatus (③). As described above, since the processor 210 knows the specific bit, for example, the bit indicating the information on the storage position of data, the processor 210 may recover the modified write logical address #LBA1 to the original write logical address LBA1 by changing or deleting the value of the corresponding bit.

A read operation of the data storage apparatus 10 according to an embodiment will be described in detail with reference to FIG. 3B.

FIG. 3B is a diagram illustrating an example of a data read operation according to an embodiment of the present disclosure.

Referring to FIG. 3B, when a read request and a read logical address LBA1 are received from a host apparatus, the processor 210 may search a logical address corresponding to the read logical address LBA1 by scanning the address mapping table AMT (⓪). For example, the searching of the logical address corresponding to the read logical address LBA1 may be performed through the processor 210 or through the address search engine 230 under the control of the processor 210. In this example, the value of the specific bit indicating the information on the preset storage position of the write data may be negligible in the process of searching the logical address corresponding to the read logical address LBA1.

When the logical address corresponding to the read logical address LBA1 is searched from the address mapping table AMT, the processor 210 may verify the value of the specific bit of the searched logical address and determine the storage position for data to be read based on the value of the specific bit.

For example, when the specific bit is the MSB and the searched logical address is "#LBA1 (for example, 0x80000001)", the processor 210 may determine a current storage position of data to be read as the write buffer WB based on the value ("1") of the MSB. Accordingly, the processor 210 may read the read-requested data from the write buffer WB and transmit the read data read from the write buffer WB to the host apparatus (②).

When the searched logical address is "LBA1 (for example, 0x00000001)", the processor 210 may determine the current storage position of the data to be read as the nonvolatile memory device 100 based on the value (for example, "0") of the MSB. Accordingly, the processor 210 may read the read-requested data from the nonvolatile memory device 100 and transmit the read data read from the nonvolatile memory device 100 to the host apparatus (②).

Figure 4:
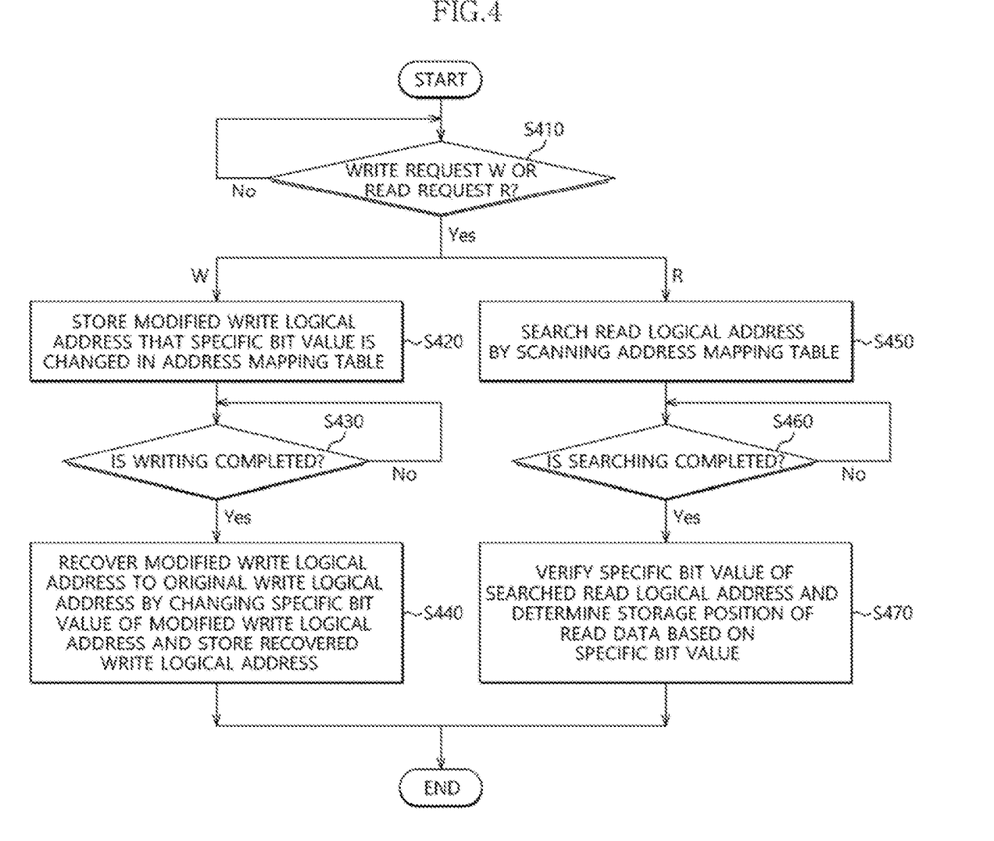
FIG. 4 is a flowchart illustrating an operating method of a data storage apparatus according to an embodiment of the present disclosure.

FIG. 4 is a flowchart illustrating an operating method of a data storage apparatus according to an embodiment of the present disclosure.

In operation S410, the processor 210 may determine whether a write request W or a read request R is received from a host apparatus. The determining operation in operation S410 may be repeatedly performed until the write request or the read request is received from the host apparatus.

When the write request W is received from the host apparatus, the processor 210 may proceed to operation S420.

In operation S420, the processor 210 may generate a modified write logical address by changing a value of a specific bit in a write logical address received from the host apparatus, and store the generated modified write logical address in the address mapping table AMT (or the first address mapping table AMT1) of the RAM 220. Simultaneously, the processor 210 may also store the write logical address and write data received from the host apparatus in the write buffer WB of the RAM 220.

In operation S430, the processor 210 may determine whether or not the write data received from the host apparatus is written in the nonvolatile memory device 100. When it is determined that the write data is written in the nonvolatile memory device 100, i.e., that the writing has been completed, the processor 210 may proceed to operation S440.

In operation S440, the processor 210 may recover the modified write logical address stored in the address mapping table AMT (or the first address mapping table AMT1) to the original write logical address by changing or deleting the value of the specific bit of the modified write logical address. The processor 210 may store the recovered write logical address in the address mapping table AMT (or the first address mapping table AMT1).

When the read request R is received from the host apparatus in operation S410, the processor 210 may proceed to operation S450.

In operation S450, the processor 210 may search a read logical address received from the host apparatus by scanning the address mapping table AMT (or the first address mapping table AMT1). The processor 210 may directly scan the address mapping table AMT (or the first address mapping table AMT1) or the address search engine 230 may scan the address mapping table AMT (or the first address mapping table AMT1) under the control of the processor 210.

In operation S460, the processor 210 may determine whether the read logical address is searched from the address mapping table AMT (or the first address mapping table AMT1). When the read logical address is searched (I.e., the searching is completed), the processor 210 may proceed to operation S470.

In operation S470, the processor 210 may verify the value of the specific bit of the searched read logical address and then determine a current storage position of read-requested data based on the value of the specific bit. For example, the processor 210 may determine whether the read-requested data is currently stored in the nonvolatile memory device 100 or in the write buffer WB based on the value of the specific bit of the read logical address searched from the address mapping table AMT (or the first address mapping table AMT1).

Although not shown in FIG. 4, after operation S470, the processor 210 may further perform operation of reading the read-requested data from the nonvolatile memory device 100 or the write buffer WB and transmitting the read-requested data to the host apparatus.

Although not shown in FIG. 4, when the RAM 220 includes the first address mapping table AMT1 and the second address mapping table AMT2 as described in FIG. 2B, in operation S450, the processor 210 may scan the first address mapping table AMT1 (or the second address mapping table AMT2) and simultaneously the address search engine 230 may scan the second address mapping table AMT2 (or the first address mapping table AMT1) under the control of the processor 210.

Figure 5:
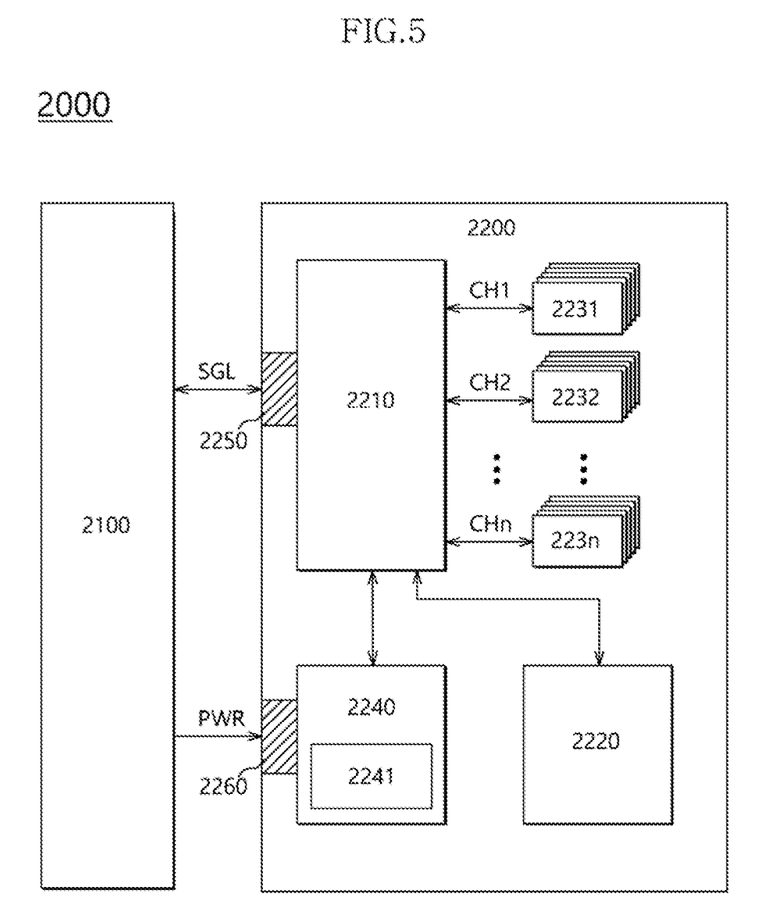
FIG. 5 is a diagram illustrating an example of a data processing system including a solid-state drive (SSD) according to an embodiment of the present disclosure.

FIG. 5 is a diagram illustrating an example of a data processing system 2000 including a solid-state drive (SSD) 2200 according to an embodiment of the present disclosure.

Referring to FIG. 5, the data processing system 2000 may include a host apparatus 2100 and the SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 6:
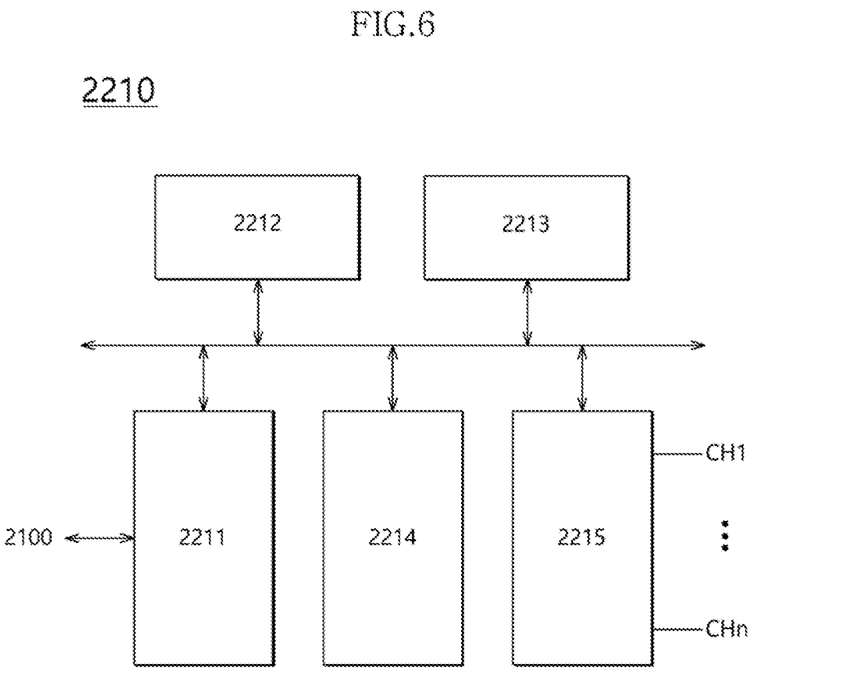
FIG. 6 is a diagram illustrating an example of a controller illustrated in FIG. 5.

FIG. 6 is a diagram illustrating an example of the controller 2210 of FIG. 5. The controller 2210 may include the components of the controller 200 of the embodiment of FIG. 1 and may perform the functions of the controller 200 as described above with reference to FIGS. 1 to 5.

Referring to FIG. 6, the controller 2210 may also include a host interface unit 2211, a control unit 2212, a random-access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software. The RAM 2213 and the control unit 2211 may be the same as the processor 210 and the RAM 220 of the controller 200.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 7:
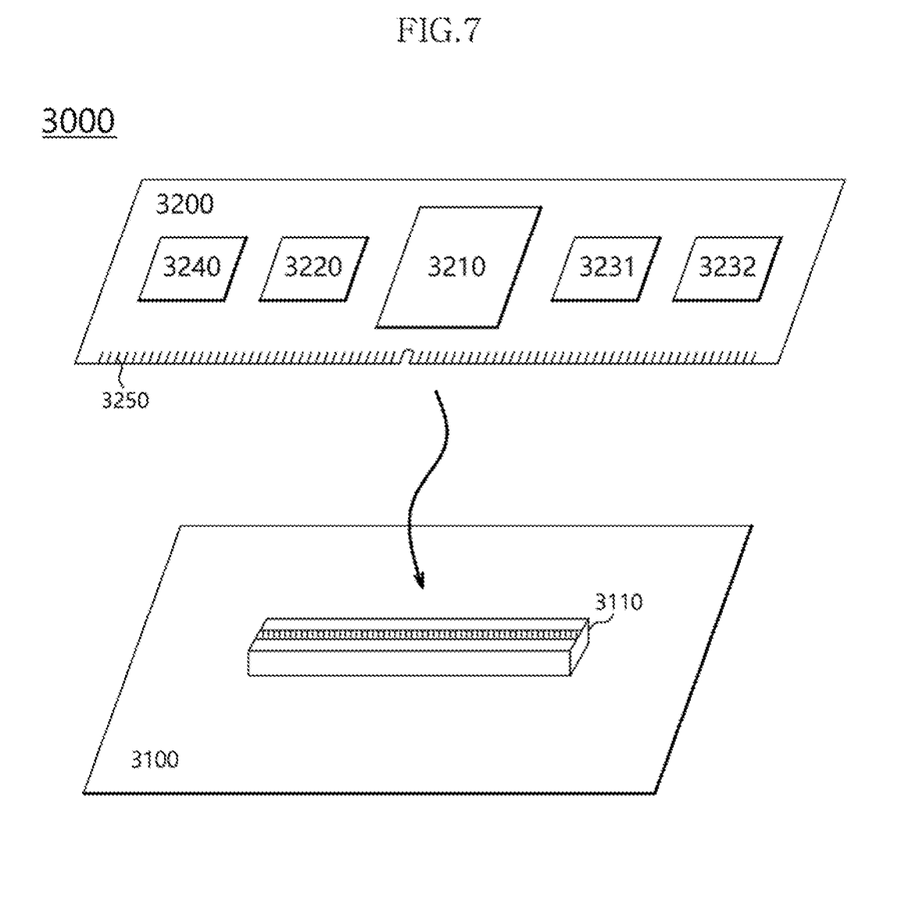
FIG. 7 is a diagram illustrating an example of a data processing system including a data storage apparatus according to an embodiment of the present disclosure.

FIG. 7 is a diagram illustrating an example of a data processing system 3000 including a data storage apparatus 3200 according to an embodiment of the present disclosure.

Referring to FIG. 7, the data processing system 3000 may include a host apparatus 3100 and the data storage apparatus 3200.

The host apparatus 3100 may be configured in a board form such as a printed circuit board (PCB). Although not shown in FIG. 7, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured In a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration and functionalities as the controller 2210.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 8:
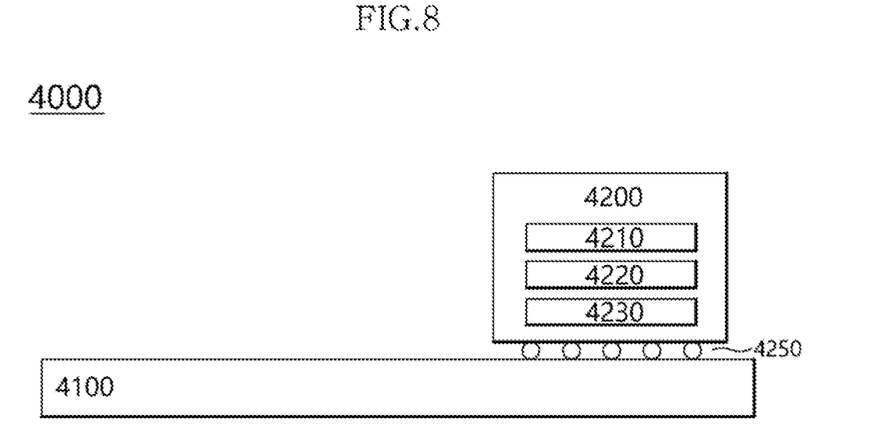
FIG. 8 is a diagram illustrating an example of a data processing system including a data storage apparatus according to an embodiment of the present disclosure.

FIG. 8 is a diagram illustrating an example of a data processing system 4000 including a data storage apparatus 4200 according to an embodiment of the present disclosure.

Referring to FIG. 8, the data processing system 4000 may include a host apparatus 4100 and the data storage apparatus 4200.

The host apparatus 4100 may be configured in a board form such as a PCB. Although not shown in FIG. 8, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 described above.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 under the control of the controller 4210.

The nonvolatile memory device 4230 may be used as a storage medium of the data storage apparatus 4200.

Figure 9:
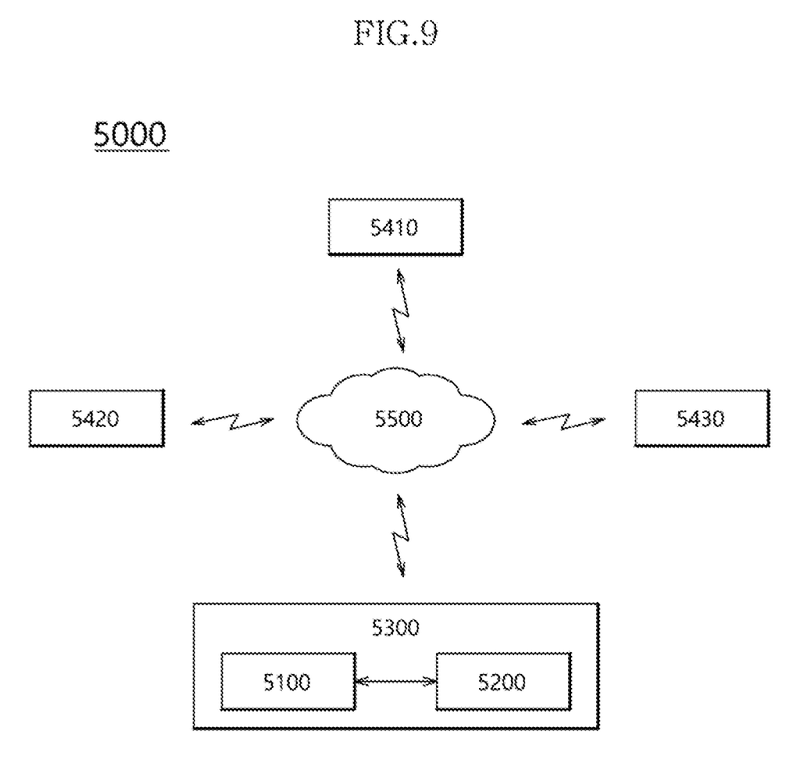
FIG. 9 is a diagram illustrating an example of a network system including a data storage apparatus according to an embodiment of the present disclosure.

FIG. 9 is a diagram illustrating an example of a network system 5000 including a data storage apparatus 5200 according to an embodiment of the present disclosure.

Referring to FIG. 9, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and the data storage apparatus 5200. The data storage apparatus 5200 may be configured as the data storage apparatus 10 of FIG. 1, the SSD 2200 of FIG. 5, the data storage apparatus 3200 of FIG. 7, or the data storage apparatus 4200 of FIG. 8.

Figure 10:
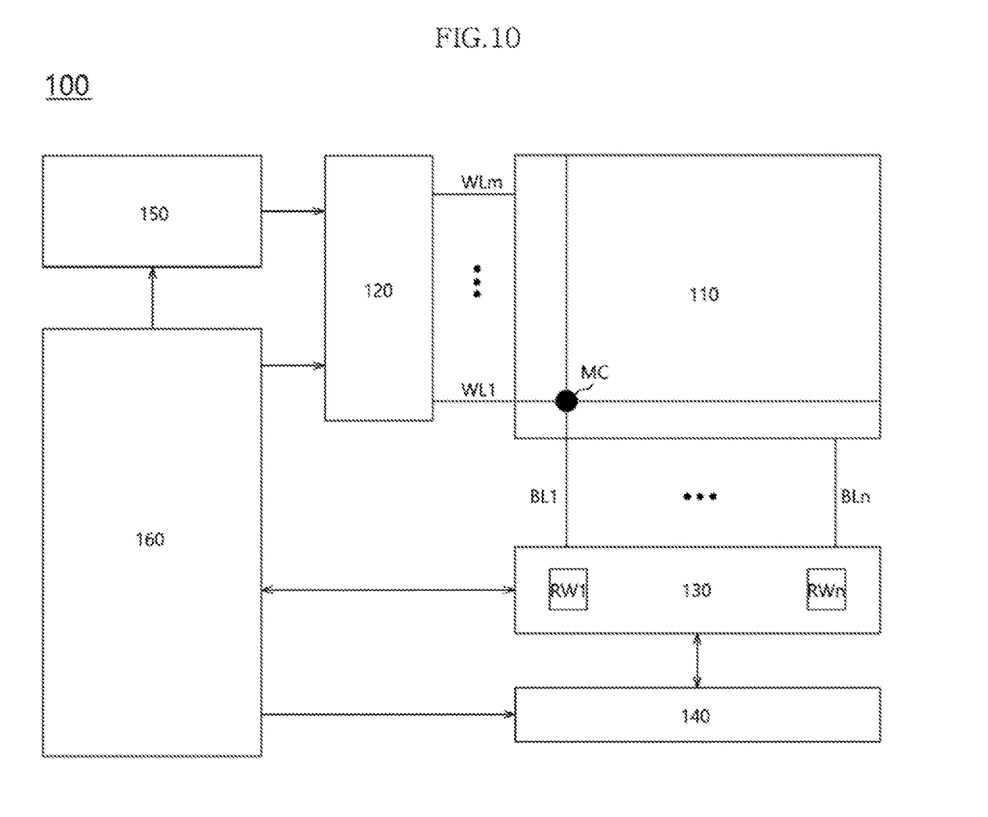
FIG. 10 is a block diagram illustrating an example of a nonvolatile memory device included in a data storage apparatus according to an embodiment of the present disclosure.

FIG. 10 is a block diagram illustrating an example of a nonvolatile memory device 100 included in a data storage apparatus according to an embodiment of the present disclosure. The nonvolatile memory device 100 may perform the functions described above in reference to FIGS. 1 to 5.

Referring to FIG. 10, the nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate under the control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the selected one from the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from the external apparatus in the memory cell array 110 in a write operation. In another example, the data read/write block 130 may operate as the sense amplifier configured to read data from the memory cell array 110 in a read operation.

The column decoder 140 may operate under the control of the control logic 160. The column decoder 140 may decode an address provided from the external apparatus. The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells on which the program operation is to be performed. In another example, an erase voltage generated in an erase operation may be applied to well regions of memory cells on which the erase operation is to be performed. In another example, a read voltage generated in a read operation may be applied to word lines of memory cells on which the read operation is to be performed.

The control logic 160 may control an overall operation of the nonvolatile memory device 100 based on a control signal provided from the external apparatus. For example, the control logic 160 may control an operation of the nonvolatile memory device 100 such as a read operation, a write operation, an erase operation of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data storage apparatus comprising:
   a nonvolatile memory device;
   a random-access memory including an address mapping table configured to store mapping information between a logical address received from a host apparatus and a physical address for the nonvolatile memory device; and
   a processor configured to generate a modified write logical address by changing a value of a specific bit among bits of a write logical address when a write request is received from the host apparatus, and store the modified write logical address in the address mapping table,
   wherein, after write data transmitted from the host apparatus is written in the nonvolatile memory device, the processor generates an original write logical address by re-changing the value of the specific bit of the modified write logical address stored in the address mapping table to an original value and stores the original write logical address in the address mapping table.

2. The data storage apparatus of claim 1, wherein the random-access memory further includes a write buffer configured to temporarily store the write logical address and the write data transmitted from the host apparatus.

3. The data storage apparatus of claim 2, wherein the processor stores the modified write logical address in the address mapping table, and simultaneously store the write logical address and the write data in the write buffer.

4. The data storage apparatus of claim 2, wherein, when a read request is received from the host apparatus, the processor searches a read logical address from the address mapping table and determines whether read-requested data is located in the nonvolatile memory device or in the write buffer based on the value of the specific bit of the searched read logical address.

5. The data storage apparatus of claim 4, further comprising:
   an address search engine configured to search the read logical address by scanning the address mapping table under the control of the processor and provide the searched read logical address to the processor.

6. The data storage apparatus of claim 1, wherein the random-access memory further includes a map cache table configured to store a portion of pieces of address mapping information on memory blocks in which a write operation is completed among a plurality of memory blocks included in the nonvolatile memory device.

7. The data storage apparatus of claim 1, wherein the address mapping table includes a physical block address to logical block address (P2L) table or a logical block address to physical block address (L2P) table.

8. An operating method of a data storage apparatus comprising:
   determining whether or not a write request is received from a host apparatus;
   generating a modified write logical address by changing a value of a specific bit of a write logical address when the write request is received from the host apparatus, and storing the modified write logical address in an address mapping table;
   determining whether or not writing for data write-requested from the host apparatus is completed; and
   generating an original write logical address by re-changing the value of the specific bit of the modified write logical address to an original value, and storing the original write logical address in the address mapping table when the writing for the data is completed.

9. The operating method of claim 8, further comprising:
   determining whether or not a read request is received from the host apparatus.

10. The operating method of claim 9, further comprising:
searching a read logical address from the address mapping table when the read request is received from the host apparatus; and
determining a storage position of data read-requested from the host apparatus based on a value of a specific bit of the searched read logical address.

11. A data storage apparatus comprising:
a nonvolatile memory device;
an address mapping table configured to store mapping information between a logical address received from a host apparatus and a physical address of the nonvolatile memory device, and store a modified write logical address when a write request is received from the host apparatus;
a write buffer configured to temporarily store a write logical address and write data when the write request is received from the host apparatus; and
a processor configured to generate the modified write logical address by changing a value of a specific bit of the write logical address, and store the modified write logical address in the address mapping table,
wherein after the write data is written in the nonvolatile memory device, the processor generates an original write logical address by re-changing the value of the specific bit of the modified write logical address stored in the address mapping table to an original value and stores the original write logical address in the address mapping table.

12. The data storage apparatus of claim 11, wherein the processor stores the modified write logical address in the address mapping table, and simultaneously store the write logical address and the write data in the write buffer.

13. The data storage apparatus of claim 11, wherein, when a read request is received from the host apparatus, the processor searches a read logical address from the address mapping table and determines whether read-requested data is located in the nonvolatile memory device or in the write buffer based on the value of the specific bit of the searched read logical address.

14. The data storage apparatus of claim 13, further comprising:
an address search engine configured to search the read logical address by scanning the address mapping table under the control of the processor and provide the searched read logical address to the processor.

15. The data storage apparatus of claim 11, further comprising:
a map cache table configured to store a portion of pieces of address mapping information on memory blocks in which a write operation is completed among a plurality of memory blocks included in the nonvolatile memory device.

16. The data storage apparatus of claim 11, wherein the address mapping table includes a physical block address to logical block address (P2L) table or a logical block address to physical block address (L2P) table.

* * * * *